United States Patent
Malik et al.

(10) Patent No.: US 10,220,718 B2
(45) Date of Patent: Mar. 5, 2019

(54) SYSTEM AND METHOD FOR CREATING A CHARGING SCHEDULE FOR AN ELECTRIC VEHICLE

(71) Applicant: Honda Motor Co., Ltd., Tokyo (JP)

(72) Inventors: Maira A. Malik, Long Beach, CA (US); Steven A. Rho, Glendale, CA (US); Robert M. Uyeki, Torrance, CA (US); Aparajithan Rajendran, Torrance, CA (US); Narendran Ravi, Torrance, CA (US); Mohitash Brijwasi, La Palma, CA (US)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 15/481,762

(22) Filed: Apr. 7, 2017

(65) Prior Publication Data

US 2018/0290553 A1  Oct. 11, 2018

(51) Int. Cl.
*H01M 10/44* (2006.01)
*H01M 10/46* (2006.01)
*B60L 11/18* (2006.01)
*H02J 7/00* (2006.01)

(52) U.S. Cl.
CPC ......... *B60L 11/1838* (2013.01); *B60L 11/184* (2013.01); *B60L 11/1809* (2013.01); *B60L 11/1861* (2013.01); *H02J 7/0073* (2013.01); *B60L 2230/00* (2013.01); *B60L 2240/72* (2013.01); *B60L 2240/80* (2013.01); *Y02T 10/7005* (2013.01); *Y02T 90/168* (2013.01); *Y04S 30/12* (2013.01)

(58) Field of Classification Search
CPC ........... H02J 7/0021; H02J 7/0047; H02J 7/04
USPC ................................ 320/104, 107, 132, 149
See application file for complete search history.

(56) References Cited

U.S. PATENT DOCUMENTS

| | | | |
|---|---|---|---|
| 7,719,232 B2 | 5/2010 | Kelty et al. | |
| 7,782,021 B2 | 8/2010 | Kelty et al. | |
| 7,786,704 B2 | 8/2010 | Kelty et al. | |
| 7,849,944 B2 | 12/2010 | Devault | |
| 8,154,246 B1 | 4/2012 | Heitmann | |
| 8,266,075 B2 | 9/2012 | Ambrosio et al. | |
| 8,498,763 B2 | 7/2013 | Hafner et al. | |
| 8,836,281 B2 | 9/2014 | Ambrosio et al. | |
| 8,855,832 B2 | 10/2014 | Rees | |
| 8,975,866 B2 | 3/2015 | McGrath et al. | |
| 9,114,794 B2 | 8/2015 | King et al. | |
| 9,306,412 B2 | 4/2016 | Yokoyama et al. | |
| 9,431,827 B2 | 8/2016 | Chow et al. | |
| 9,457,791 B2 | 10/2016 | Vitale et al. | |
| 2011/0047102 A1 | 2/2011 | Grider et al. | |
| 2011/0178959 A1 | 7/2011 | Nakajima et al. | |
| 2012/0245750 A1* | 9/2012 | Paul | G06Q 50/06 700/291 |

(Continued)

*Primary Examiner* — Edward Tso
(74) *Attorney, Agent, or Firm* — Rankin, Hill & Clark LLP

(57) ABSTRACT

A system and method for creating a charging schedule for an electric vehicle that include determining a current state of charge of the electric vehicle. The system and method also include determining an average price per kilowatt-hour of energy to charge the electric vehicle to reach at least one of: a target state of charge of the electric vehicle and a maximum state of charge of the electric vehicle. The system and method further include creating the charging schedule based on the current state of charge and the average price per kilowatt-hour of energy.

18 Claims, 5 Drawing Sheets

(56) References Cited

U.S. PATENT DOCUMENTS

| | | | |
|---|---|---|---|
| 2013/0307475 A1* | 11/2013 | Kishiyama | H02J 7/0027 320/109 |
| 2014/0236379 A1 | 8/2014 | Masuda et al. | |
| 2014/0253036 A1* | 9/2014 | Kinomura | B60L 11/123 320/109 |
| 2014/0347018 A1 | 11/2014 | Boblett et al. | |
| 2015/0077239 A1 | 3/2015 | Litjen | |
| 2015/0298569 A1* | 10/2015 | Kosetsu | H02J 7/041 320/155 |
| 2016/0236585 A1 | 8/2016 | Miftakhov et al. | |
| 2016/0245662 A1* | 8/2016 | Rajagopalan | G01C 21/3469 |
| 2017/0267118 A1* | 9/2017 | Akashi | B60M 3/06 |

* cited by examiner

SYSTEM AND METHOD FOR CREATING A CHARGING SCHEDULE FOR AN ELECTRIC VEHICLE

BACKGROUND

Electric vehicles contain electric storage mechanisms (e.g., electric engines powered by rechargeable batteries) to store electricity and power the electric vehicle. The electric storage mechanisms may be replenished periodically by using, for example, charging equipment installed at a residential home or charging equipment installed at public or private charging stations. Owners of electric vehicles may be typically concerned about balancing charging efficiency and costs. In many cases, when owners connect their electric vehicles to charge, the electric vehicles may charge to a maximum state of charge (e.g., 100% state of charge of the rechargeable batteries) regardless of the cost of energy during the charging session. Some utility providers have implemented "Time of Use" rates for electric vehicle charging to encourage off-peak charging thereby minimizing grid impact such that the cost of energy may vary from one charging session to another.

BRIEF DESCRIPTION

According to one aspect, a computer-implemented method for creating a charging schedule for an electric vehicle that includes determining a current state of charge of the electric vehicle. Determining the current state of charge includes determining if the current state of charge is above at least one of: a minimum state of charge of the electric vehicle and a target state of charge of the electric vehicle. The method also includes determining an average price per kilowatt-hour of energy to charge the electric vehicle to reach at least one of: the target state of charge and a maximum state of charge of the electric vehicle. The method further includes creating the charging schedule based on the current state of charge and the average price per kilowatt-hour. Charging of the electric vehicle is controlled to reach at least one of the target state of charge and the maximum state of charge.

According to another aspect, a system for creating a charging schedule for an electric vehicle is provided. The system includes a memory storing instructions that, when executed by a processor, cause the processor to determine a current state of charge of the electric vehicle. Determining the current state of charge includes determining if the current state of charge is above at least one of: a minimum state of charge of the electric vehicle and a target state of charge of the electric vehicle. The instructions also cause the processor to determine an average price per kilowatt-hour of energy to charge the electric vehicle to reach at least one of: the target state of charge and a maximum state of charge of the electric vehicle. The instructions further cause the processor to create the charging schedule based on the current state of charge and the average price per kilowatt-hour. Charging of the electric vehicle is controlled to reach at least one of the target state of charge and the maximum state of charge.

According to still another aspect, a non-transitory computer readable storage medium stores instructions that, when executed by a computer, which includes at least a processor, causes the computer to perform a method that includes determining a current state of charge of an electric vehicle. Determining the current state of charge includes determining if the current state of charge is above at least one of: a minimum state of charge of the electric vehicle and a target state of charge of the electric vehicle. The instructions also include determining an average price per kilowatt-hour of energy to charge the electric vehicle to reach at least one of: the target state of charge and a maximum state of charge of the electric vehicle. The instructions further include creating a charging schedule based on the current state of charge and the average price per kilowatt-hour. Charging of the electric vehicle is controlled to reach at least one of the target state of charge and the maximum state of charge.

DETAILED DESCRIPTION

Figure 1:
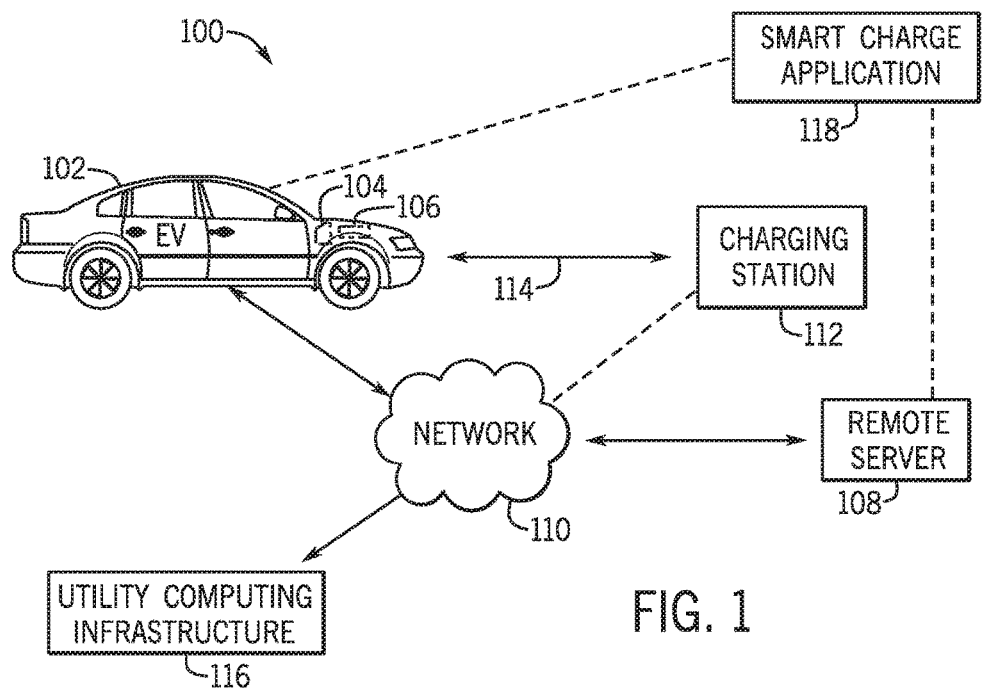
FIG. 1 is a high-level schematic view of an illustrative system for creating a charging schedule for an electric vehicle according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

Referring now to the drawings, wherein the showings are for purposes of illustrating one or more exemplary embodiments and not for purposes of limiting same, FIG. 1 is a high-level schematic view of an illustrative system 100 for creating a charging schedule for an electric vehicle (EV) 102 according to an exemplary embodiment. The components of the system 100, as well as the components of other systems and architectures discussed herein, may be combined, omitted or organized into different architectures for various embodiments.

In the exemplary embodiment of FIG. 1, the system 100 includes the EV 102 powered by an electric motor 104 and an electric storage mechanism, for example, a battery 106. In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operatively connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote server or a device remote (e.g., off-board) from the EV 102. The system architectures of the EV 102 and the remote server 108 will be discussed in more detail herein with reference to FIGS. 2 and 3.

In the exemplary embodiment of FIG. 1, the system 100 may include a charging station 112 that may connect to the EV 102 via a charging link 114. The charging station 112 may replenish one or more electric storage mechanism (e.g., the battery 106) of the EV 102. Additionally, in some embodiments, the charging station 112 may be operably connected for computer communication with the EV 102 and/or the remote server 108, for example, to transmit and receive data (e.g., charge parameters, charging data and feedback, vehicle system data) to and from the EV 102 and/or the remote server 108. The charging link 114 may be a wired or wireless link to the charging station 112. Computer communication may occur also via the charging link 114 and/or a wired or wireless communication link. As discussed below, in one embodiment, the EV 102, the charging station 112 and/or the charging link 114 may be operably controlled to initiate or terminate charging of the EV 102 from the charging station 112 based on one or more charging schedules that are implemented within the system 100.

In one or more embodiments, the charging station 112 may include charging equipment and may be installed at a residential home or outside a residential home, for example, at a public (e.g., non-networked) or private (e.g., networked) charging station. The charging station 112 may include a charging station identification designation (e.g., identification number, serial number, alpha-numeric code, station name) that may be used to identify the particular charging station 112. The charging station may replenish the battery 106 using a charging energy source type that indicates the type of energy the charging station provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In an exemplary embodiment, the EV 102, the charging station 112, and/or the remote server 108 may receive and transmit data through the network 110 to a utility computing infrastructure 116. The utility computing infrastructure 116 may include one or more computing devices (not shown) that may communicate to one or more energy providers (e.g., utility companies) that may include a facility for generating, transmitting and/or distributing energy to consumers.

In one embodiment, the utility computing infrastructure 116 may receive perspective and/or real-time price data that may be provided by each respective energy provider to communicate different utility rates. The perspective and/or real-time price data may include daily energy rates during a certain period of time (e.g, hourly, daily, weekly). In one embodiment, the utility computing infrastructure 116 may determine a price per kilowatt-hour of energy (price per kWh) that may be communicated to the EV 102, the remote server 108, and/or the charging station 112 based on utility rates that are received from the one or more energy providers. The price per kWh may include a dynamic value that may change over time based on a time of day, a season, a region, a time zone, etc. For example, each hour of a particular day may include a difference price per kWh based on one or more pricing schemes that are implemented by the one or more energy providers.

In one or more embodiments, the one or more pricing schemes that are implemented by the one or more energy providers may include time of use (TOU) rates that are provided as a pricing strategy to provide energy pricing based on the time-of-day the energy is utilized, the location the energy is provided, and/or the energy is delivered. TOU rates may be dynamic based on a current supply-demand situation (e.g., grid load), such that the one or more energy providers may provide lower TOU rates during off-peak hours than on-peak hours. The one or more energy providers may provide TOU rates that may be implemented to provide different prices based on pricing schemes that may include lower usage peak, higher usage peak, higher usage off-peak, lower usage off-peak, and the like.

In one embodiment, the utility computing infrastructure 116 may receive the perspective and/or real-time price data and may communicate the price per kWh for one or more periods of time that the EV 102 may be charged based on one or more charging schedules that are implemented by a smart charge application 118 of the system 100. In an exemplary embodiment, the smart charge application 118 may be executed by the EV 102 (e.g., a processor, an electronic control unit) and/or the remote server 108 (e.g., a processor). The smart charge application 118 may include various modules and/or logic to facilitate creation and implementation of the one or more charging schedules and/or charging of the EV 102. As described in more detail below, the smart charge application 118 may determine a current state of charge (SOC) of the EV 102 (e.g., the current charge value of the battery 106 of the EV 102).

In an exemplary embodiment, the one or more charging schedules may respectively include one or more time slots (e.g., quarter hour, half-hour, hourly, etc.) that may further include one or more levels of charging (e.g., 0-10) that may be provided to the EV 102 during the respective time slots at one or more charging intervals. As discussed below, the smart charge application 118 may create the one or more charging schedules to charge the EV 102 to a target SOC or a maximum SOC based on analyzing the current SOC of the EV 102 and the price per kWh for one or more periods of time provided by the utility computing infrastructure 116.

Figure 2:
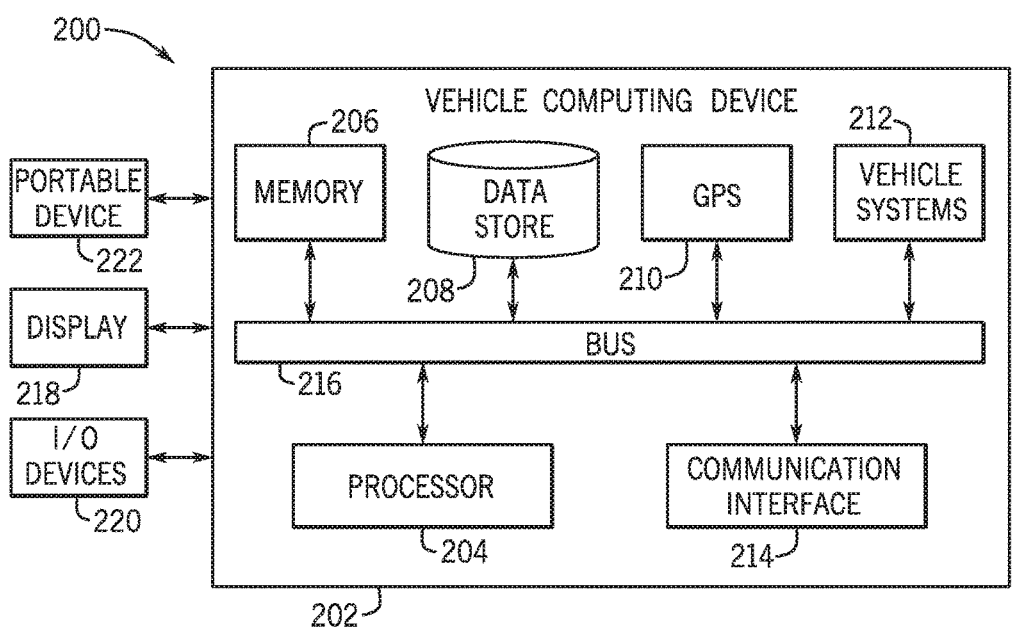
FIG. 2 is a schematic view of an illustrative electric vehicle architecture according to an exemplary embodiment.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The data store 208 may store application data that may also include data pertaining to the smart charge application 118. The communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., a head unit, a display stack, a heads-up display) in the EV 102 and other input/output devices 220, for example, a portable device 222 (e.g., key fob, smart phone) connected to the EV 102. In some embodiments the portable device 222, may include some or all of the components and functionality of the vehicle computing device 202. Additionally, the communication interface 214 may facilitate communication between the EV 102 and the portable device 222 that may include a display and/or input/output devices (not shown) be used to operate various functions of the EV 102. In one embodiment, the display 218 of the EV 102 and/or the portable device 222 may be utilized to provide one user interfaces including application user interfaces that may be included as a human machine interface(s) for the smart charge application 118.

Figure 3:
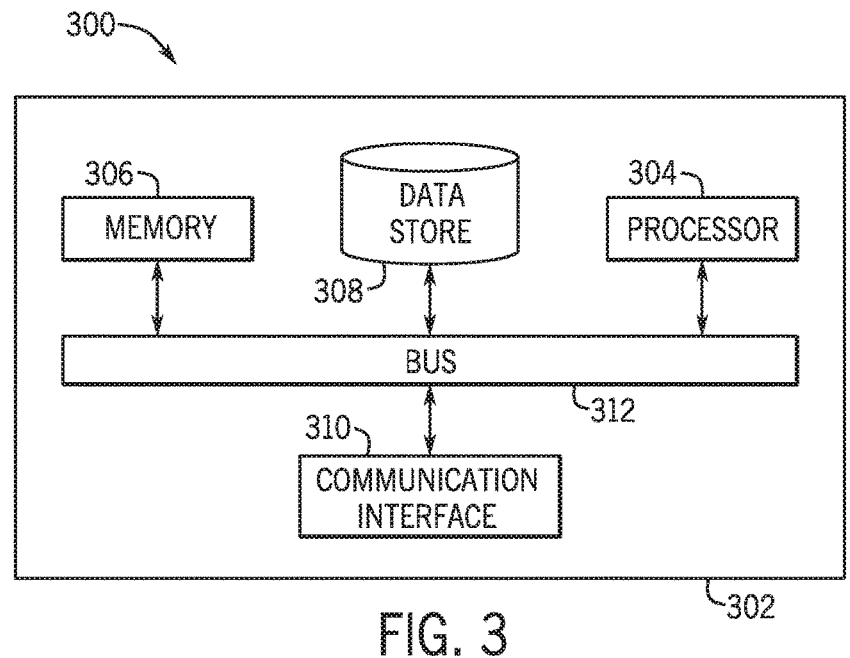
FIG. 3 is a schematic view of an illustrative remote server architecture according to an exemplary embodiment.

Referring now to FIG. 3, a schematic view of an illustrative remote server architecture 300, for example the remote server 108 of FIG. 1, is shown according to an exemplary embodiment. The remote server 108, is located remotely (i.e., off-board) from the EV 102 (FIG. 1) and, in some embodiments may be maintained by an Original Equipment Manufacturer (OEM) (e.g., of the EV 102), a utility provider, a regulatory body, among others. Additionally, in some embodiments, the remote server 108 may be another type of remote device or supported by a cloud architecture. In FIG. 3, the remote server 108 may include a computing device 302 that may further include a processor 304, a memory 306, a data store 308 and a communication interface 310. The components of the architecture 300, including the computing device 302, may be operably connected for computer communication via a bus 312 and/or other wired and wireless technologies. The computing device 302 as well as the remote server 108 may include other components and systems not shown.

The data store 308 may store application data that may also include data pertaining to the smart charge application 118. The communication interface 310 provides software, firmware and/or hardware to facilitate data input and output between the components of the computing device 302 and other components, networks and data sources. In some embodiments, the communication interface 310 may be used to communicate with the EV 102, the charging station 112, the portable device 222, and/or other components of system 100 and architecture 200.

The smart charge application 118 and its components will now be discussed in more detail according to an exemplary embodiment and with continued reference to FIGS. 1-3. In one or more embodiments, the smart charge application 118 may be executed by the vehicle computing device 202 of the EV 102 and/or the computing device 302 of the remote server 108. Data may be sent or received from the smart charge application 118 to the components of the EV 102, the remote server 108, the charging station 112, charging link 114, the and/or the portable device 222. For example, commands from the smart charge application 118 may be sent to the charging station 112 and/or the charging link 114 to initiate or terminate charging of the EV 102 during one or more periods of time based on the one or more factors and/or the one or more charging schedules.

In an exemplary embodiment, the smart charge application 118 may include one or more user input interfaces and/or input means (e.g., buttons) that may be presented via the display 218, presented via the portable device 222, and or included within the EV 102 and/or on the portable device 222. In one embodiment, the one or more user input interfaces and/or input means may include enable and disable inputs that may be utilized by an individual to enable or disable smart charging functionality. More specifically, if the individual utilizes the enable input to enable the smart charging functionality, the smart charge application 118 may create one or more charging schedules based on analyzing the current SOC of the EV 102 and the price per kWh for one or more periods of time provided by the utility computing infrastructure 116. Conversely, if the individual utilizes the disable input to disable the smart charging, the smart charge application 118 may not create the one or more charging schedules and may only initiate charging based on an input of a charge execution input. The charge execution input may be utilized to initiate charging of the EV 102 based on the individual's intent to have the EV 102 charged for a period of time per his/her choosing or until the EV 102 reaches a maximum SOC.

In one or more embodiments, the one or more user input interfaces may include a charging station interface. The charging station interface may allow individuals to designate the charging station 112 and additional charging systems (not shown) as saved charging station(s). The saved charging station(s) may include charging station(s) that may readily utilized by the individual to charge the EV 102. For example, the saved charging station(s) may include the charging station 112 that may be located at the individual's home and another charging station (not shown) that may be located at the individual's office. The designation of saved charging station(s) may be utilized by the smart charge application 118 to create one or more charging schedules that pertain to the EV 102. In other words, when enabled, the smart charge application 118 may only create the one or more charging schedules that pertain to the EV 102 when it is determined that the EV 102 is connected to a saved charging station(s). For example, if the individual designates the charging station 112 as a saved charging station, if the smart charge application 118 determines the EV 102 is connected to the charging station 112, the smart charge application 118 may create the one or more charging schedules that pertain to the EV 102.

In one embodiment, upon designating the charging station 112 as the saved charging station(s), the smart charge application 118 may determine the charging station identification designation that is associated to the charging station 112 and may be communicated by the charging station 112 to the EV 102 and/or the remote server 108. Upon determining the charging station identification designation, the smart charge application 118 may populate a saved charging station list (e.g., database) with the charging station identification designation.

In an alternate embodiment, upon the EV 102 being connected to the charging station 112 and upon labeling the charging station 112 as the saved charging(s) based on utilization of the charging station interface, the smart charge application 118 may utilize the GPS 210 of the EV 102 to determine the location of the EV 102. More specifically, the smart charge application 118 may communicate with the GPS 210 to determine the GPS locational coordinates of the EV 102 to determine the location of the (labeled) charging station 112 as it is connected to the EV 102 via the charging link 114. Upon determining the GPS location coordinates of the EV 102, the smart charge application 118 may populate the GPS location coordinates of the EV 102 and an identification name of the (labeled) charging station 112 (that may include the charging station identification designation) to the saved charging station list. In one embodiment, the smart charge application 118 may provide the individual with the saved charging station list on the charging station interface wherein the individual may add additional information, edit information, and/or delete the saved charging station(s) on the saved charging station list.

In an exemplary embodiment, the smart charge application 118 may communicate with the battery of the EV 102 to determine a maximum allowed charge of the battery 106. The maximum allowed charge of the battery 106 may be a level of charge that represents the battery 106 being fully charged at 100%. The smart charge application 118 may store the maximum allowed charge as the maximum state of charge of the EV 102 within the data store 208 and/or the data store 308.

In one embodiment, the smart charge application 118 may also communicate with the battery of the EV 102 to determine a minimum required charge of the battery 106. The minimum required charge of the battery 106 may include a minimum charge that is required for the battery 106 to operate the electric motor 104 of the EV 102 for a predetermined time range (e.g., 40-60 minutes based on operation of the EV 102) and/or a predetermined distance range (e.g., 10-20 miles based on the operation of the EV 102). Upon determining the minimum required charge of the battery 106, the smart charge application 118 may store the minimum required charge of the battery 106 as the minimum SOC of the EV 102 within the data store 208 and/or the data store 308. As will be discussed below, the minimum SOC may be utilized by the smart charge application 118 as a threshold value that may be compared to the current SOC of the EV 102. For example, the minimum SOC may include a SOC of 10% that may be utilized as the threshold value that may be compared to the current SOC of the EV 102 when the smart charging functionality is enabled and the EV 102 is connected to the charging station 112 (labeled as the saved charging station) via the charging link 114.

In one embodiment, the smart charge application 118 may communicate with the battery 106, the GPS 210, and/or the plurality of vehicle systems 212 to determine a driving profile of the EV 102. The driving profile of the EV 102 may include a profile of the average distance and/or time the EV 102 is driven during one or more specific timeframes. For example, the driving profile of the EV 102 may include a profile of the average distance and/or time the EV 102 is driven for each day of the week.

In an exemplary embodiment, the smart charge application 118 may evaluate the driving profile of the EV 102 and may determine one or more (dynamic) target SOC values that may fluctuate on a time by time basis based on the driving profile of the EV 102. For example, in some instances the driving profile of the EV 102 may include a similar set of distance/time values during a typical work week (Monday through Friday) than on a typical weekend. Therefore, the driving profile may be useful in determining one or more target values for each hour of each day within the typical work week and typical weekend. The smart charge application 118 may determine the target SOC as a required charge of the battery 106 that is above the minimum SOC and below the maximum SOC that may be utilized as a target to provide enough energy to operate the EV 102 during the course of a particular day based on the driving profile of the EV 102.

In an alternate embodiment, the one or more user input interfaces may include a target threshold interface. The target threshold interface may be utilized by the OEM and/or an individual to set one or more customized target threshold values (e.g., percentages of charge of the battery 106) for one or more timeframes. The smart charge application 118 may implement the customized target threshold values as the one or more target SOC values that may be used at one or more particular timeframes (e.g., days) based on the one or more customized target threshold values.

As will be discussed below, the target SOC may be utilized by the smart charge application 118 as a threshold value that may be compared to the current SOC of the EV 102. For example, the target SOC may include a SOC of 50% that may be utilized as the threshold value that may be compared to the current SOC of the EV 102 when the smart charging functionality is enabled and the EV 102 is connected to the charging station 112 (labeled as the saved charging station) via the charging link 114.

Figure 4:
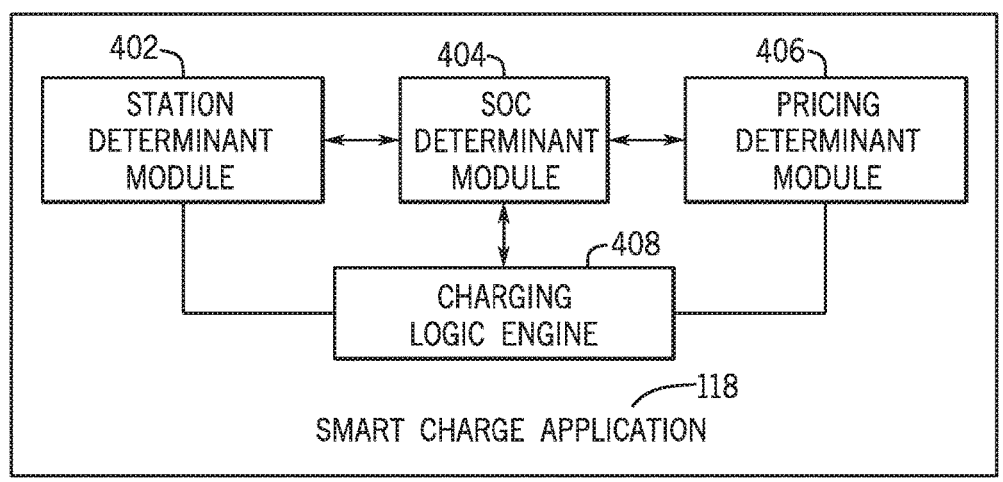
FIG. 4 is a schematic view of an illustrative smart charge application according to an exemplary embodiment.

Referring now to FIG. 4, a schematic view of the smart charge application 118 is shown according to an exemplary embodiment. As discussed, the smart charge application 118 may include various modules and/or logic to facilitate creation and implementation of the one or more charging schedules and/or charging of the EV 102. In an exemplary embodiment, the smart charge application 118 may include a station determinant module 402, a SOC determinant module 404, a pricing determinant module 406, and a charging logic engine 408.

In an exemplary embodiment, the station determinant module 402 may determine if the one or more charging stations that the EV 102 is connected to via connection link(s) is labeled as the saved charging station(s). If the station determinant module 402 determines that the EV 102 is connected to saved charging station(s) and that smart charging functionality is enabled, the station determinant module 402 may communicate the determination that the charging station 112 is the saved charging station to the charging logic engine 408 to create the one or more charging schedules to charge the EV 102 per the enabled smart charging functionality.

In one embodiment, upon connecting to the charging station 112 (or alternative charging station(s)) via the charging link 114, the station determinant module 402 may determine that the EV 102 is connected to the charging station 112 and may communicate with the charging station 112 to determine the charging station identification designation that may be associated with the charging station 112. Upon determining the charging station identification designation of the charging station 112, the station determinant module 402 may access the saved charging station list to query the list for the charging station identification designation of the charging station 112. If the charging station identification designation of the charging station 112 is retrieved based on the query of the saved charging station list, the station determinant module 402 may determine that the charging station 112 is designated as the saved charging station.

In another embodiment, upon connecting to the charging station 112 (or alternative charging station(s)) via the charging link 114, the station determinant module 402 may determine that the EV 102 is connected to the charging station 112 and may communicate with the GPS 210 of the EV 102 to determine current GPS locational coordinates of the EV 102. Upon determining the GPS locational coordinates of the EV 102, the station determinant module 402 may access the saved charging station list to query the list for GPS locational coordinates that are within a predetermined locational range of the current GPS locational coordinates that may include the previously stored GPS location coordinates of the EV 102 associated with identification name of the charging station 112 (labeled as the saved charging station). If the GPS location coordinates of the EV 102 that were previously stored are determined to be within the predetermined locational range of the current location coordinates of the EV 102, the station determinant module 402 may determine that the charging station 112 is the saved charging station.

In an exemplary embodiment, the SOC determinant module 404 may communicate with the battery 106 of the EV 102 to determine the current SOC of the EV 102. The battery 106 may communicate a difference between an amount of charge of the battery 106 (a real time charging level of the battery 106) and the maximum allowed charge of the battery 106 (a full charging level of the battery 106) to the SOC determinant module 404. The SOC determinant module 404 may determine the current SOC of the EV 102 based on the difference between the amount of charge of the battery 106 and the maximum allowed charge of the battery 106. As discussed below, the SOC determinant module 404 may communicate the current SOC of the EV 102 to the charging logic engine 408 to create the one or more charging schedules to charge the EV 102 per the enabled smart charging functionality.

In one embodiment, when the current SOC of the EV 102 is below the target SOC, the pricing determinant module 406 may determine an average price per kWh to charge the EV 102 from the current SOC to the target SOC. The pricing determinant module 406 may additionally determine an average price per kWh to charge the EV 102 from the current SOC to the maximum SOC. More specifically, the pricing determinant module 406 may communicate with the utility computing infrastructure 116 to determine the price per kWh of energy that may be based on utility rates that are received from the one or more energy providers. As stated above, the price per kWh of energy may include a dynamic value that may change over time based on a time of day, a season, a region, a time zone, etc.

As discussed below, the pricing determinant module 406 may evaluate the current SOC of the EV 102 with respect to the target SOC of the EV 102 and/or the maximum SOC of the EV 102. The charging logic engine 408 may calculate a time to charge value (TTC value) that may be provided for each the target SOC and maximum SOC to the pricing determinant module 406. The TTC value may reflect an estimated time to charge the battery 106 of the EV 102 from the current SOC to the target SOC. Additionally, another TTC value may reflect an estimated time to charge the battery 106 of the EV 102 from the current SOC to the target SOC. In one or more embodiments, the pricing determinant module 406 may determine the average price(s) per kWh based on the TTC to achieve the target SOC and/or the maximum SOC based on the particular timeframe (e.g., time, day, etc.) for a particular charging session of the EV 102.

In an exemplary embodiment, the charging logic engine 408 may receive data from the aforementioned modules 402, 404, 406 of the smart charge application 118 and may create the one or more charging schedules based on the current SOC of the EV 102 and the average price per kWh of energy to achieve one or more SOC(s) of the EV 102. The smart charging functionality will now be discussed in more detail with respect to exemplary scenarios. The exemplary scenarios pertain to the current SOC of the EV 102 as supplied by the SOC determinant module 404 during enablement of the smart charging functionality of the smart charge application 118.

Figure 5:
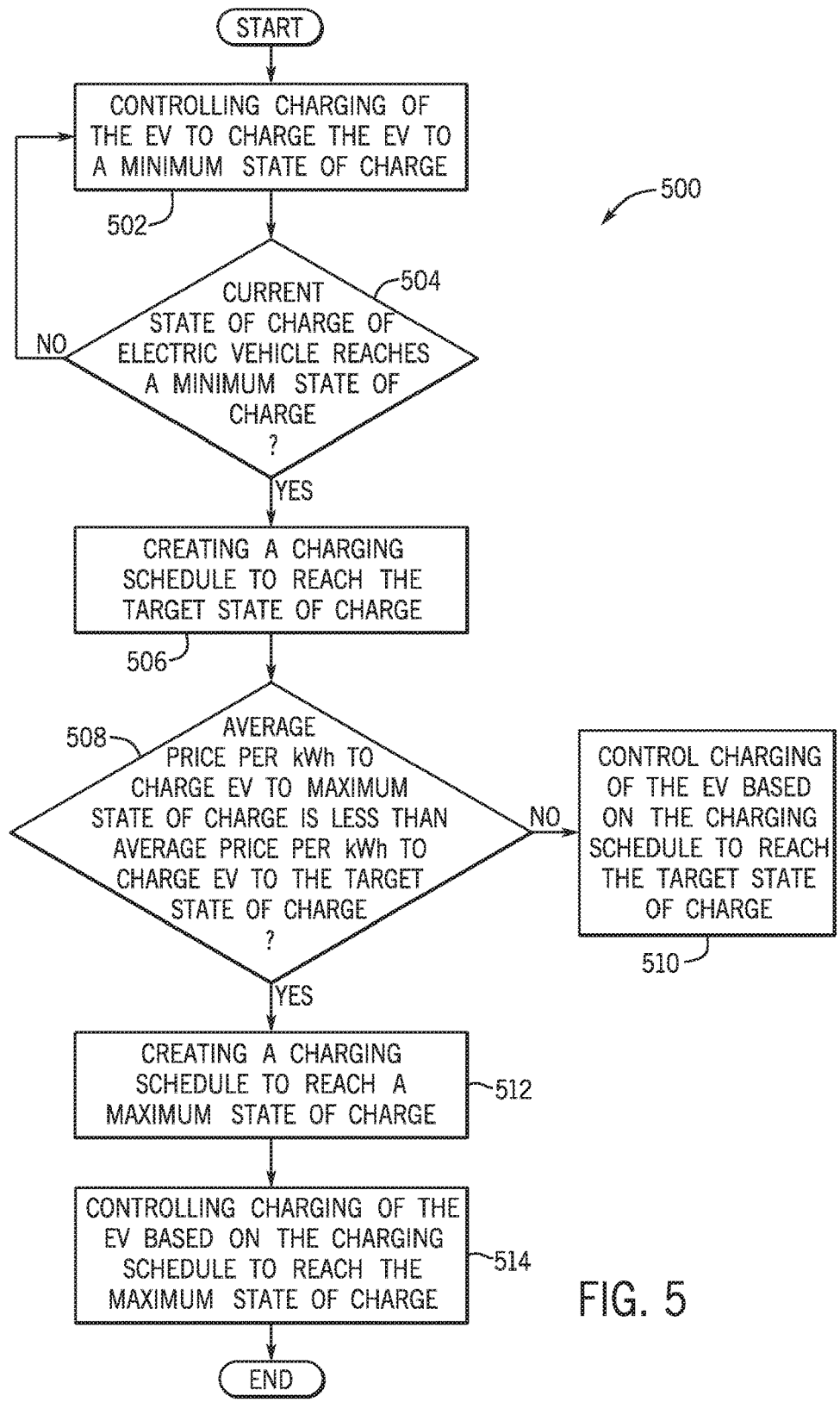
FIG. 5 is a process flow diagram of an illustrative method for creating the charging schedule for a charging session when a current state of charge of the electric vehicle is below a minimum state of charge of the electric vehicle according to an exemplary embodiment.

FIG. 5 is a process flow diagram of an illustrative method 500 for creating the charging schedule for a charging session when the current SOC of the EV 102 is below the minimum SOC of the EV 102 according to an exemplary embodiment. FIG. 5 will be described with reference to the components of FIGS. 1-4 though it is to be appreciated that the method 500 of FIG. 5 may be used with other systems and/or components. The method 500 may be implemented by the smart charge application 118 upon the application 118 determining that the smart charge functionality of the application 118 has been enabled or has not been disabled from a previous state of enablement. Additionally, the method 500 may be implemented when the station determinant module 402 determines that the EV 102 is connected to the saved charging station during the charging session. For example, when the station determinant module 402 determines that the EV 102 is connected to charging station 112 labeled as the saved charging station via the charging link 114.

In an exemplary embodiment, upon the EV 102 being connected to the charging station 112 to initiate the charging session, the SOC determinant module 404 may communicate with the battery 106 of the EV 102 and may determine the current SOC of the EV 102. Upon determining the current SOC of the EV 102, the SOC determinant module 404 may communicate the current SOC to the charging logic engine 408. The charging logic engine 408 may compare the current SOC to the minimum SOC, the target SOC (that may apply to the timeframe of the initiated charging session), and the maximum SOC. If the charging logic engine 408 determines that the current SOC is below the minimum SOC, the smart charge application 118 may initiate the method 500 at block 502, wherein the method 500 may including controlling charging of the EV 102 to charge the EV 102 to a minimum SOC. In one embodiment, the charging logic engine 408 may calculate the TTC value of the EV 102 from the current SOC to the minimum SOC. Upon determining the TTC value, the charging logic engine 408 may communicate the TTC value to the vehicle computing device 202 of the EV 102 and may send the charging signal(s) to initiate immediate charging of the EV 102 by the charging station 112 to the minimum SOC based on the TTC value. In another embodiment, the charging logic engine 408 may communicate the TTC value to the charging station 112 and may send the charging signal(s) to initiate charging of the EV 102 directly to the charging station 112 to immediately charge the EV 102 to the minimum SOC based on the TTC value. The EV 102 may be supplied with energy from the charging station 112 to charge the EV 102 for a period of time that may correspond to the TTC value.

The method 500 may proceed to block 504, wherein the method 500 may include determining if the current SOC of the EV 102 reaches the minimum SOC. In one embodiment, upon the initialization of the immediate charging of the EV 102, the SOC determinant module 404 may check the current SOC of the EV 102 based on a predetermined frequency (e.g., every 30 seconds) to determine if the current SOC of the EV 102 reaches the minimum SOC. Upon determining that the current SOC of the EV 102 reaches the minimum SOC, the SOC determinant module 404 may send a corresponding signal(s) to the charging logic engine 408. In some embodiments, upon receipt of the signal(s) from the SOC determinant module 404 that pertains to the current SOC of the EV 102 reaching the minimum SOC, the charging logic engine 408 may send charging disable signal(s) to the vehicle computing device 202 and/or the charging station 112 to disable charging of the EV 102.

If it is determined that the current SOC of the EV 102 does not reach the minimum SOC (at block 504), charging of the EV 102 may continue (per block 502). If it is determined that the current SOC of the EV 102 does reach the minimum SOC (at block 504), the method 500 may proceed to block 506, wherein the method 500 may include creating a charging schedule to reach a target SOC. In an exemplary embodiment, the charging logic engine 408 may receive the current SOC of the EV 102 from the SOC determinant module 404 and may calculate a TTC value of the EV 102 from the current SOC of the EV 102 to the target SOC. The pricing determinant module 406 may communicate with the pricing determinant module 406 to determine the price per kWh of energy for one or more periods of time provided by the utility computing infrastructure 116.

In one embodiment, the charging logic engine 408 may create the charging schedule to enable and disable charging of the EV 102 at one or more charging intervals. The charging schedule may respectively include one or more time slots (e.g., quarter hour, half-hour, hourly, etc.) that may further include one or more levels of charging that may be provided to the EV 102 at one or more charging intervals during one or more of the respective time slots until the current SOC of the EV 102 reaches the target SOC. In some embodiments, the one or more charging intervals of the charging schedule may be determined based on one or more price thresholds and the aforementioned driving profile. In other words, the one or more charging intervals may pertain to the one or more timeframes that provide the most efficient pricing per kWh of energy and/or that may be optimal to charge the EV 102 based on the driving profile. For example, the charging schedule may include one or more charging intervals that take place during a longer period of time on a weekend that may include off-peak hours when the EV 102 may not be as frequently used. On the other hand, the charging schedule may include one or more charging intervals that may take place (more frequently) during a shorter period of time on a weekday that may include some peak-hours and some off-peak hours when the EV 102 may be used more frequently.

Upon creating the charging schedule to reach the target SOC (at block 506), the method 500 may proceed to block 508, wherein the method 500 may include determining if the average price per kWh to charge the EV 102 to the maximum SOC is less than an average kWh to charge the EV 102 to the target SOC. In an exemplary embodiment, the charging logic engine 408 may calculate a TTC value of the EV 102 from the current SOC of the EV 102 to the maximum SOC. The charging logic engine 408 may communicate the TTC value of the EV 102 from the current SOC to the maximum SOC and the TTC value of the EV 102 from the minimum SOC to the target SOC (discussed at block 506). Upon receiving the TTC values the pricing determinant module 406 may communicate with the utility computing infrastructure 116 to determine the price per kWh of energy that may be based on utility rates that are received from the one or more energy providers during the charging session.

In one embodiment, the pricing determinant module 406 may determine the average price per kWh based on the TTC value to achieve the target SOC from the current SOC based on the particular timeframe (e.g., time, day, etc.) for the charging session of the EV 102 (e.g., average of the price per kWh for each of the hours that include the TTC value to achieve the target SOC from the current SOC). Additionally, the pricing determinant module 406 may determine the average price per kWh based on the TTC to achieve the maximum SOC from the current SOC based on the particular timeframe for the charging session of the EV 102 (e.g., average of the price per kWh for each of the hours that include the TTC value to achieve the target SOC from the current SOC). Upon determining the average price per kWh to charge the EV 102 to the target SOC and the maximum SOC, the pricing determinant module 406 may communicate the average prices per kWh to the charging logic engine 408 to determine if the average price per kWh to charge the EV 102 to the maximum SOC is less than the average price per kWh to charge the EV 102 to the target SOC.

If it is determined that the average price per kWh to charge the EV 102 to the maximum SOC is more than the average price per kWh to charge the EV 102 to the target SOC (at block 508), the method 500 may proceed to block 510, wherein the method 500 may include controlling charging of the EV 102 based on the charging schedule to reach the target SOC. In one embodiment, the charging logic engine 408 may communicate charging signals to the vehicle computing device 202 of the EV 102 to initiate charging of the EV 102 at one or more intervals that correspond to the one or more charging intervals that are included within the charging schedule to reach the target SOC (created at block 506) by the charging station 112. In another embodiment, the charging logic engine 408 may additionally or alternatively communicate charging signals directly to the charging station 112 to initiate charging of the EV 102 at one or more intervals that correspond to the one or more charging intervals that are included within the charging schedule to reach the target SOC.

If it is determined that the average price per kWh to charge the EV 102 to the maximum SOC is less than the average price per kWh to charge the EV 102 to the target SOC (at block 508), the method 500 may proceed to block 512, wherein the method 500 may include creating a charging schedule to reach a maximum SOC. In one embodiment, the pricing determinant module 406 may communicate with the pricing determinant module 406 to determine the price per kWh of energy for one or more periods of time provided by the utility computing infrastructure 116.

In one embodiment, the charging logic engine 408 may create the charging schedule to enable and disable charging of the EV 102 at one or more charging intervals until the current SOC of the EV 102 reaches the maximum SOC. The charging schedule may respectively include one or more time slots (e.g., quarter hour, half-hour, hourly, etc.) that may further include one or more levels of charging that may be provided to the EV 102 at one or more charging intervals during one or more of the respective time slots until the current SOC of the EV 102 reaches the maximum SOC. In some embodiments, the one or more charging intervals of the charging schedule may be determined based on one or more price thresholds and the aforementioned driving profile.

Upon creating the charging schedule to reach the maximum SOC (at block 512), the method 500 may proceed to block 514, wherein the method 500 may include controlling charging of the EV 102 based on the charging schedule to reach the maximum SOC. In one embodiment, the charging logic engine 408 may communicate charging signals to the vehicle computing device 202 of the EV 102 to initiate charging of the EV 102 at one or more intervals that correspond to the one or more charging intervals that are included within the charging schedule to reach the maximum SOC (created at block 512). In another embodiment, the charging logic engine 408 may additionally or alternatively communicate charging signals directly to the charging station 112 to initiate charging of the EV 102 at one or more intervals that correspond to the one or more charging intervals that are included within the charging schedule to reach the maximum SOC.

Figure 6:
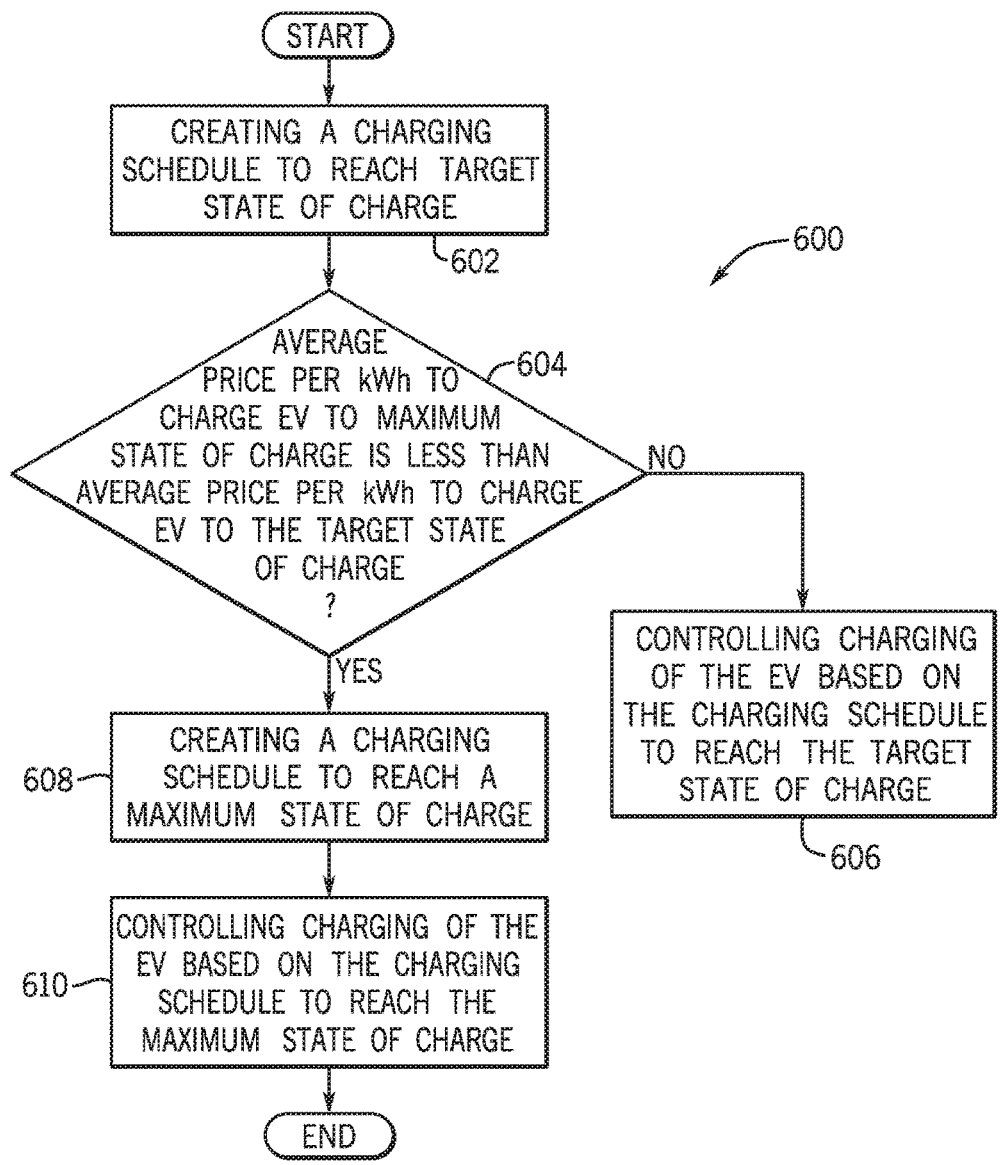
FIG. 6 is a process flow diagram of an illustrative method for creating the charging schedule for a charging session when the current state of charge of the electric vehicle is above the minimum state of charge of the electric vehicle and below a target state of charge of the electric vehicle according to an exemplary embodiment.

FIG. 6 is a process flow diagram of an illustrative method 600 for creating the charging schedule for a charging session when the current SOC of the EV 102 is above the minimum SOC of the EV 102 and below the target SOC of the EV 102 according to an exemplary embodiment. FIG. 6 will be described with reference to the components of FIGS. 1-4 though it is to be appreciated that the method 600 of FIG. 6 may be used with other systems and/or components. The method 600 may be implemented by the smart charge application 118 upon the application 118 determining that the smart charge functionality of the application 118 has been enabled or has not been disabled from a previous state of enablement. Additionally, the method 600 may be implemented when the station determinant module 402 determines that the EV 102 is connected to the saved charging station during the charging session.

In an exemplary embodiment, upon determining the current SOC of the EV 102, the SOC determinant module 404 may communicate the current SOC to the charging logic engine 408. The charging logic engine 408 may compare the current SOC to the minimum SOC, the target SOC (that may apply to the timeframe of the initiated charging session), and the maximum SOC. If the charging logic engine 408 determines that the current SOC is above the minimum SOC but below the target SOC, the smart charge application 118 may initiate the method 600 at block 602, wherein the method 600 may include creating a charging schedule to reach a target SOC. As discussed above, the charging logic engine 408 may create the charging schedule to enable and disable charging of the EV 102 at one or more charging intervals. The charging schedule may be provided to the EV 102 at one or more charging intervals during one or more of the respective time slots until the current SOC of the EV 102 reaches the target SOC.

Upon creating the charging schedule to reach the target SOC (at block 602), the method 600 may include determining if the average price per kWh to charge the EV 102 to the maximum SOC is less than the average price per kWh to charge the EV 102 to the target SOC. As discussed above, the pricing determinant module 406 may determine the average price per kWh based on the TTC value to achieve the target SOC from the current SOC based on the particular timeframe (e.g., time, day, etc.) for the charging session of the EV 102. Additionally, the pricing determinant module 406 may determine the average price per kWh based on the TTC to achieve the maximum SOC from the current SOC based on the particular timeframe for the charging session of the EV 102. Upon determining the average price per kWh to charge the EV 102 to the target SOC and the maximum SOC, the pricing determinant module 406 may communicate the average prices per kWh to the charging logic engine 408 to determine if the average price per kWh to charge the EV 102 to the maximum SOC is less than the average price per kWh to charge the EV 102 to the target SOC.

If it is determined that the average price per kWh to charge the EV 102 to the maximum SOC is more than the average price per kWh to charge the EV 102 to the target SOC (at block 604), the method 600 may proceed to block 606, wherein the method 600 may include controlling the charging of the EV 102 based on the charging schedule to reach the target SOC. The charging logic engine 408 may communicate charging signals to the vehicle computing device 202 and/or the charging station 112 to initiate charging of the EV 102 at one or more intervals that correspond to the one or more charging intervals that are included within the charging schedule to reach the target SOC.

If it is determined that the average price per kWh to charge the EV 102 to the maximum SOC is less than the average price per kWh to charge the EV 102 to the target SOC (at block 604), the method 600 may proceed to block 608, wherein the method 600 may include creating a charging schedule to reach a maximum SOC. The charging logic engine 408 may create the charging schedule to enable and disable charging of the EV 102 at one or more charging intervals until the current SOC of the EV 102 reaches the maximum SOC. The charging schedule may be provided to the EV 102 at one or more charging intervals during one or more of the respective time slots until the current SOC of the EV 102 reaches the maximum SOC.

The method 600 may proceed to block 610, wherein the method 600 may include controlling charging of the EV 102 based on the charging schedule to reach the maximum SOC. As discussed above, the charging logic engine 408 may communicate charging signals to the vehicle computing device 202 and/or the charging station 112 to initiate charging of the EV 102 at one or more intervals that correspond to the one or more charging intervals that are included within the charging schedule to reach the maximum SOC.

Figure 7:
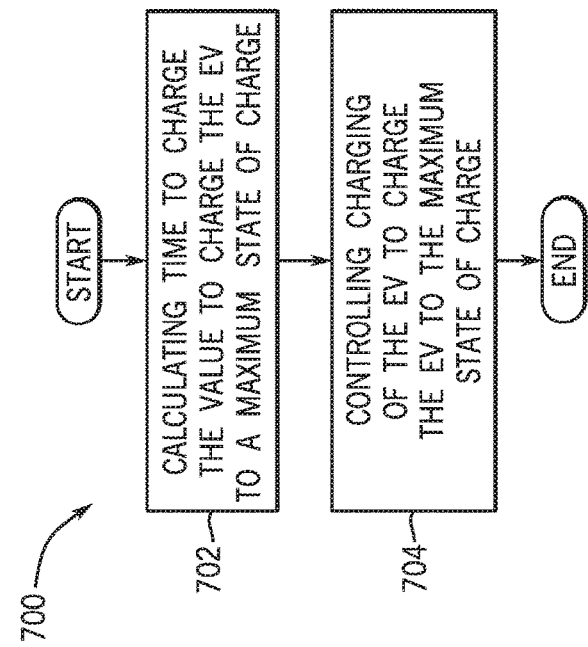
FIG. 7 is a process flow diagram of an illustrative method for creating the charging schedule for a charging session when the current state of charge of the electric vehicle is above the target state of charge of the electric vehicle according to an exemplary embodiment.

FIG. 7 is a process flow diagram of an illustrative method 700 for creating the charging schedule for a charging session when the current SOC of the EV 102 is above the target SOC of the EV 102 according to an exemplary embodiment. FIG. 7 will be described with reference to the components of FIGS. 1-4 though it is to be appreciated that the method 700 of FIG. 7 may be used with other systems and/or components. The method 700 may be implemented by the smart charge application 118 upon the application 118 determining that the smart charge functionality of the application 118 has been enabled or has not been disabled from a previous state of enablement. Additionally, the method 700 may be implemented when the station determinant module 402 determines that the EV 102 is connected to the saved charging station during the charging session.

In an exemplary embodiment, upon determining the current SOC of the EV 102, the SOC determinant module 404 may communicate the current SOC to the charging logic engine 408. The charging logic engine 408 may compare the current SOC to the minimum SOC, the target SOC (that may apply to the timeframe of the initiated charging session), and the maximum SOC. If the charging logic engine 408 determines that the current SOC is above the target SOC, the smart charge application 118 may initiate the method 700 at block 702, wherein the method 700 may include calculating a TTC value to charge the EV to a maximum SOC. In one embodiment, upon receiving the current SOC from the SOC determinant module 404, the charging logic engine 408 may calculate the TTC value of the EV 102 from the current SOC to the maximum SOC. In one embodiment, the charging logic engine 408 may send communication signal(s) to the display 218 and/or the portable device 222 to present the calculated TTC value as a remaining time required to charge the EV 102 to the maximum SOC to the individual. The individual may utilize this information to determine if he/she would like to disable the smart charging functionality or allow the charging of the EV 102 to initiate.

Upon calculating the TTC value to charge the EV 102 to the maximum SOC (at block 702), at block 704, the method 700 may include controlling charging of the EV 102 to charge the EV 102 to the maximum SOC. In one embodiment, the charging logic engine 408 may communicate the TTC value to the vehicle computing device 202 of the EV 102 and may send the charging signal(s) to initiate immediate charging of the EV 102 to the maximum SOC based on the TTC value. In another embodiment, the charging logic engine 408 may communicate the TTC value to the charging station 112 and may send the charging signal(s) to initiate charging of the EV 102 directly to the charging station 112 to immediately charge the EV 102 to the maximum SOC based on the TTC value.

With continued reference to FIGS. 1-4, in one embodiment, if the individual inputs the disable input that may be utilized by the individual to disable smart charging functionality, the smart charge application 118 may not create the one or more charging schedules and may only initiate charging based on an input of a charge execution input. In one embodiment, if the EV 102 is determined to be connected to the saved charging station(s), and the individual inputs the charge execution input via the display 218 and/or the portable device 222 (e.g., via an input button on a key fob), the charging logic engine 408 may calculate the TTC value to charge the EV 102 to the maximum SOC and may communicate the TTC value to the vehicle computing device 202 of the EV 102 and/or the charging station 112.

The charging logic engine 408 may send the charging signal(s) to the vehicle computing device 202 and/or the charging station 112 to initiate immediate charging of the EV 102 to the maximum SOC based on the TTC value.

Figure 8:
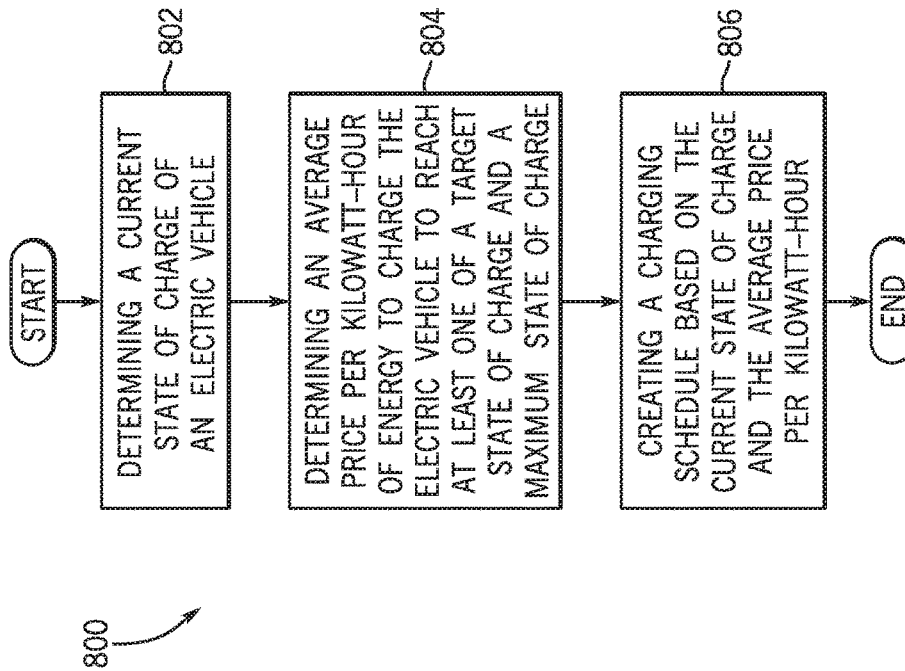
FIG. 8 is a process flow diagram of an illustrative method for creating the charging schedule for the electric vehicle according to an exemplary embodiment.

FIG. 8 is a process flow diagram of an illustrative method 800 for creating a charging schedule for the EV 102 according to an exemplary embodiment. FIG. 8 will be described with reference to the components of FIGS. 1-4 though it is to be appreciated that the method of FIG. 8 may be used with other systems and/or components. The method 800 may start at block 802, wherein the method 800 may include determining a current SOC of an EV 102. The method may proceed to block 804, wherein the method 800 may include determining an average price per kWh of energy to charge the EV 102 to reach at least one of a target SOC and a maximum SOC.

The method 800, may proceed to block 806, wherein the method 800 may include creating a charging schedule based on the current SOC and the average price per kWh. As discussed above, the charging of the EV 102 may be controlled to reach the maximum SOC when it is determined that the average price per kWh of energy to charge the EV to the maximum SOC is less than the average price per KWh of energy to charge the EV to the target SOC.

The embodiments discussed herein may also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data. Computer-readable storage media excludes non-transitory tangible media and propagated data signals.

The invention claimed is:

1. A computer-implemented method for creating a charging schedule for an electric vehicle, comprising:
    determining a current state of charge of the electric vehicle, wherein determining the current state of charge includes determining if the current state of charge is above at least one of: a minimum state of charge of the electric vehicle and a target state of charge of the electric vehicle;
    determining an average price per kilowatt-hour of energy to charge the electric vehicle to reach at least one of: the target state of charge and a maximum state of charge of the electric vehicle;
    creating the charging schedule based on the current state of charge and the average price per kilowatt-hour; and
    controlling charging of the electric vehicle to reach the minimum state of charge upon determining that the current state of charge is below the minimum state of charge and controlling charging of the electric vehicle to reach the maximum state of charge upon determining that the current state of charge is above the target state of charge.

2. The computer-implemented method of claim 1, further including determining the target state of charge, wherein determining the target state of charge includes determining a driving profile of the electric vehicle, wherein the driving profile of the electric vehicle includes a profile of at least one of: an average distance the electric vehicle is driven during at least one specific timeframe, and an average time the electric vehicle is driven during the at least one specific timeframe.

3. The computer-implemented method of claim 2, wherein determining the target state of charge includes evaluating the driving profile of the electric vehicle and determining the target state of charge, wherein the target state of charge is dynamic and is based on the driving profile.

4. The computer-implemented method of claim 1, wherein creating the charging schedule includes creating the charging schedule to reach the target state of charge, wherein creating the charging schedule to reach the target state of charge includes determining one or more charging intervals based on at least one price threshold and a driving profile of the electric vehicle.

5. The computer-implemented method of claim 4, wherein creating the charging schedule includes determining if the average price per kilowatt-hour of energy to charge the electric vehicle to the maximum state of charge is less than the average price per kilowatt-hour of energy to charge the electric vehicle to the target state of charge.

6. The computer-implemented method of claim 5, wherein creating the charging schedule includes controlling charging of the electric vehicle to reach the target state of charge based on the charging schedule to reach the target state of charge upon determining that the average price per kilowatt-hour of energy to charge the electric vehicle to the maximum state of charge is more than the average price per kilowatt-hour of energy to charge the electric vehicle to the target state of charge.

7. The computer-implemented method of claim 5, wherein creating the charging schedule includes creating the charging schedule to reach the maximum state of charge upon determining that the average price per kilowatt-hour of energy to charge the electric vehicle to the maximum state of charge is less than the average price per kilowatt-hour of energy to charge the electric vehicle to the target state of charge.

8. The computer-implemented method of claim 7, wherein creating the charging schedule includes controlling charging of the electric vehicle to reach the maximum state of charge based on the charging schedule to reach the maximum state of charge.

9. A system for creating a charging schedule for an electric vehicle, comprising:
    a memory storing instructions when executed by a processor cause the processor to:
    determine a current state of charge of the electric vehicle, wherein determining the current state of charge includes determining if the current state of charge is above at least one of: a minimum state of charge of the electric vehicle and a target state of charge of the electric vehicle;
    determine an average price per kilowatt-hour of energy to charge the electric vehicle to reach at least one of: the target state of charge and a maximum state of charge of the electric vehicle; and
    create the charging schedule based on the current state of charge and the average price per kilowatt-hour; and
    control charging of the electric vehicle to reach the minimum state of charge upon determining that the current state of charge is below the minimum state of charge and controlling charging of the electric vehicle to reach the maximum state of charge upon determining that the current state of charge is above the target state of charge.

10. The system of claim 9, further including determining the target state of charge, wherein determining the target state of charge includes determining a driving profile of the electric vehicle, wherein the driving profile of the electric vehicle includes a profile of at least one of: an average distance the electric vehicle is driven during at least one specific timeframe, and an average time the electric vehicle is driven during the at least one specific timeframe.

11. The system of claim 10, wherein determining the target state of charge includes evaluating the driving profile of the electric vehicle and determining the target state of charge, wherein the target state of charge is dynamic and is based on the driving profile.

12. The system of claim 9, wherein creating the charging schedule includes creating the charging schedule to reach the target state of charge, wherein creating the charging schedule to reach the target state of charge includes determining one or more charging intervals based on at least one price threshold and a driving profile of the electric vehicle.

13. The system of claim 12, wherein creating the charging schedule includes determining if the average price per kilowatt-hour of energy to charge the electric vehicle to the maximum state of charge is less than the average price per kilowatt-hour of energy to charge the electric vehicle to the target state of charge.

14. The system of claim 13, wherein creating the charging schedule includes controlling charging of the electric vehicle to reach the target state of charge based on the charging schedule to reach the target state of charge upon determining that the average price per kilowatt-hour of energy to charge the electric vehicle to the maximum state of charge is more than the average price per kilowatt-hour of energy to charge the electric vehicle to the target state of charge.

15. The system of claim 13, wherein creating the charging schedule includes creating the charging schedule to reach the maximum state of charge upon determining that the average price per kilowatt-hour of energy to charge the electric vehicle to the maximum state of charge is less than the average price per kilowatt-hour of energy to charge the electric vehicle to the target state of charge.

16. The system of claim 15, wherein creating the charging schedule includes controlling charging of the electric vehicle to reach the maximum state of charge based on the charging schedule to reach the maximum state of charge.

17. A non-transitory computer readable storage medium storing instructions that, when executed by a computer, which includes at least a processor, causes the computer to perform a method, the method comprising:
   determining a current state of charge of an electric vehicle, wherein determining the current state of charge includes determining if the current state of charge is above at least one of: a minimum state of charge of the electric vehicle and a target state of charge of the electric vehicle;
   determining an average price per kilowatt-hour of energy to charge the electric vehicle to reach at least one of: the target state of charge and a maximum state of charge of the electric vehicle; and
   creating a charging schedule based on the current state of charge and the average price per kilowatt-hour; and
   controlling charging of the electric vehicle to reach the minimum state of charge upon determining that the current state of charge is below the minimum state of charge and controlling charging of the electric vehicle to reach the maximum state of charge upon determining that the current state of charge is above the target state of charge.

18. The non-transitory computer readable storage medium of claim 17, wherein creating the charging schedule includes determining if the average price per kilowatt-hour of energy to charge the electric vehicle to the maximum state of charge is less than the average price per kilowatt-hour of energy to charge the electric vehicle to the target state of charge.

* * * * *